(12) United States Patent
Pan

(10) Patent No.: US 9,454,950 B2
(45) Date of Patent: Sep. 27, 2016

(54) BELL DEVICE WITH DUAL TONES FOR TRANSPORT VEHICLES

(71) Applicant: Chang-Yu Pan, Kaohsiung (TW)

(72) Inventor: Chang-Yu Pan, Kaohsiung (TW)

( * ) Notice: Subject to any disclaimer, the term of this patent is extended or adjusted under 35 U.S.C. 154(b) by 134 days.

(21) Appl. No.: 14/564,128

(22) Filed: Dec. 9, 2014

(65) Prior Publication Data

US 2016/0163301 A1 Jun. 9, 2016

(51) Int. Cl.
*G10K 1/072* (2006.01)
*G10K 5/00* (2006.01)
*G10K 1/26* (2006.01)

(52) U.S. Cl.
CPC .................. *G10K 1/072* (2013.01); *G10K 1/26* (2013.01); *G10K 5/00* (2013.01)

(58) Field of Classification Search
CPC .......... G10K 1/072; G10K 1/26; G10K 5/00; B62J 3/00
USPC ....... 116/137 R, 142 FP, 148, 149, 151, 155, 116/166, 167; 446/216
See application file for complete search history.

(56) References Cited

U.S. PATENT DOCUMENTS

| 1,389,589 A * | 9/1921 | Kohn ........................ A63H 5/00 446/203 |
| 7,182,039 B2 * | 2/2007 | Ichimura et al. ...... G10K 1/072 116/166 |
| 2008/0163812 A1 * | 7/2008 | Lin ........................... B62J 3/00 116/137 R |

FOREIGN PATENT DOCUMENTS

| DE | 29616915 U1 * | 11/1996 | ............... G10K 5/00 |
| EP | 1403849 A2 * | 3/2004 | ............... G10K 1/26 |

* cited by examiner

*Primary Examiner* — Richard A Smith
(74) *Attorney, Agent, or Firm* — Alan D Kamrath; Kamrath IP Lawfirm, P.A.

(57) ABSTRACT

A bell device with dual tones for transport vehicles includes a main body, a base, and a trigger. The main body includes two tapering chambers therein and a pinhole located between the chambers. A constant whistling sound is generated for warning approaching cars and pedestrians when wind introduced into one of the two chambers passes through the pinhole. The base is adapted to be fixed on a handlebar and supports the main body, so that the main body is rotatable relative to the base. The trigger includes a flexible operating member which has at least a knocking portion used to beat the main body and induce a warning sound when the operating member is manipulated.

5 Claims, 8 Drawing Sheets

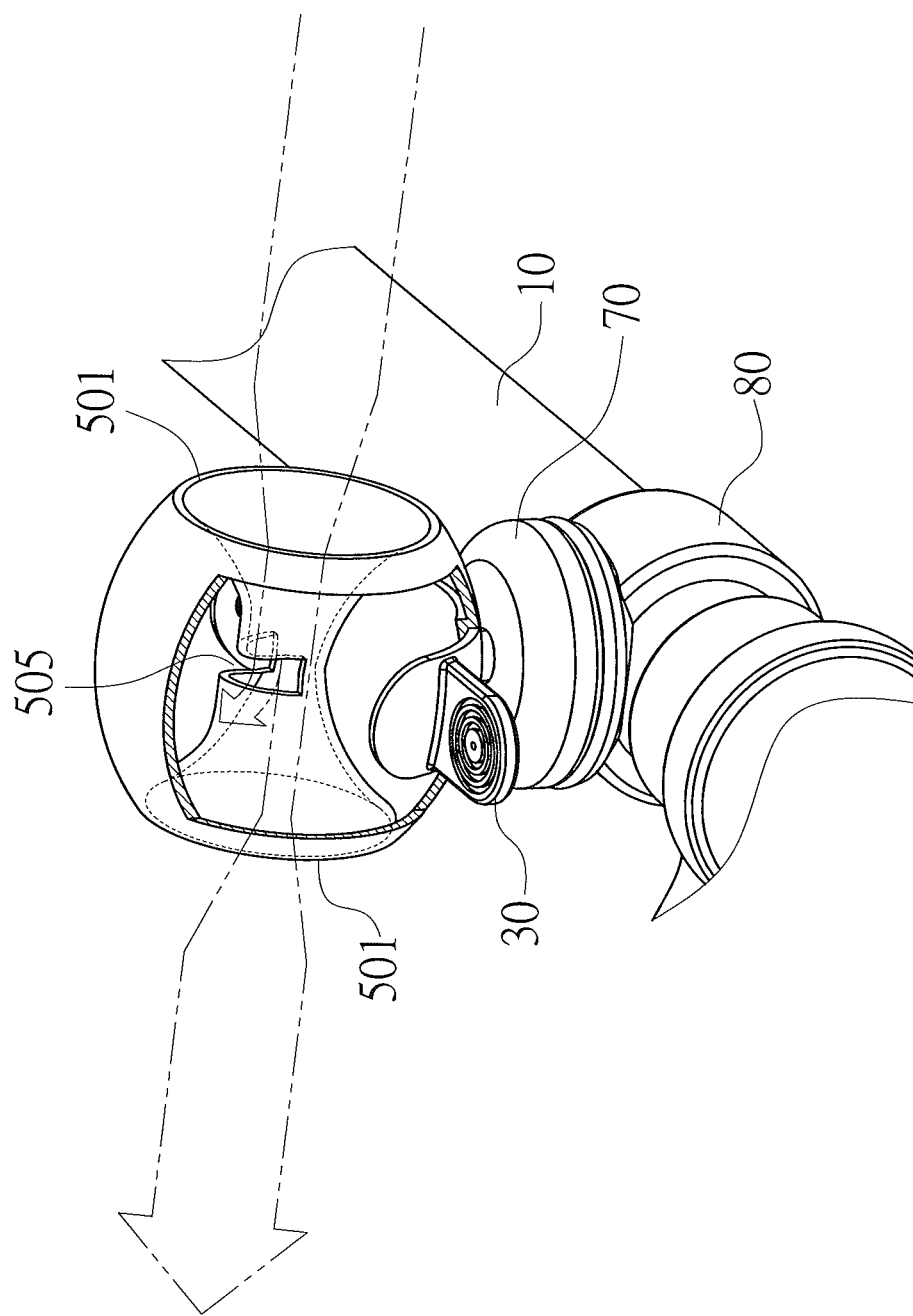

BELL DEVICE WITH DUAL TONES FOR TRANSPORT VEHICLES

BACKGROUND OF THE INVENTION

1. Field of the Invention

The present invention relates to a bell device and, more particularly, to a bell device with dual tones for transport vehicles.

2. Description of the Related Art

A conventional bicycle bell usually installed on a bicycle handlebar can be driven to make a sound warning approaching cars or pedestrians. To make a sound, the bicycle bell needs to be rung by a biker. However, the biker, who does not ring the bicycle bell timely while confronting any emergency status, may be at risk.

Moreover, it is inconvenient to use the conventional bicycle bell, which should be manually driven to make a sound, on actual roads. Specifically, a biker cycling a long distance may be at stake while feeling fatigued and forgetting to ring a bicycle bell. Accordingly, conventional bell devices for transport vehicles with limited practicability are not available to conditions of long-term exercise.

BRIEF SUMMARY OF THE INVENTION

Therefore, an objective of the present invention is to provide a bell device with dual tones for transport vehicles, which is characteristic of dual warning tones including a constant whistling sound warning approaching cars and pedestrians as well as another warning sound induced by a biker based on personal preference or traffic status for traffic safety.

To achieve this and other objectives, a bell device of the present invention includes a main body, a base, and a trigger. The main body includes a peripheral wall and two resonance chambers formed inside the peripheral wall. Each of the two resonance chambers includes an external opening in the peripheral wall, an internal opening in an inner end thereof, and a cavity tapered from the external opening to the internal opening. The internal openings of the chambers are spaced from each other, defining a pinhole between the two chambers. The base is adapted to be mounted on a handlebar and engaged with a support member provided on a bottom of the main body. The main body is supported by the base and rotatable relative to the base. The trigger includes a flexible operating member installed between the main body and the base and including at least one knocking portion. A constant whistling sound is induced for warning approaching cars and pedestrians when wind introduced into one of the two chambers passes through the pinhole. The knocking portion beats the main body and induces a warning sound when the operating member is manipulated.

In a preferred form, the internal openings of the two chambers are spaced from each other and arranged as a mismatch pattern.

In a preferred form, a conjunction member is held inside the base. Two aligned through-holes are respectively provided in the base and the conjunction member, and the support member extends through the through-holes of the base and the conjunction member and is coupled with the conjunction member. The operating member includes an aperture which is penetrated by the support member. The operating member includes two knocking portions formed at two sides thereof and adjacent or attached to the peripheral wall of the main body. An operating portion extends from each of the knocking portions, and the knocking portion beats the main body for generation of a sound when the operating portion is operated.

The present invention will become clearer in light of the following detailed description of illustrative embodiments of this invention described in connection with the drawings.

DESCRIPTION OF THE DRAWINGS

The illustrative embodiments may best be described by, reference to the accompanying drawings where:

FIG. 8 is a schematic view which illustrates the bell device in FIG. 2 makes a whistling sound.

DETAILED DESCRIPTION OF THE INVENTION

Figure 1:
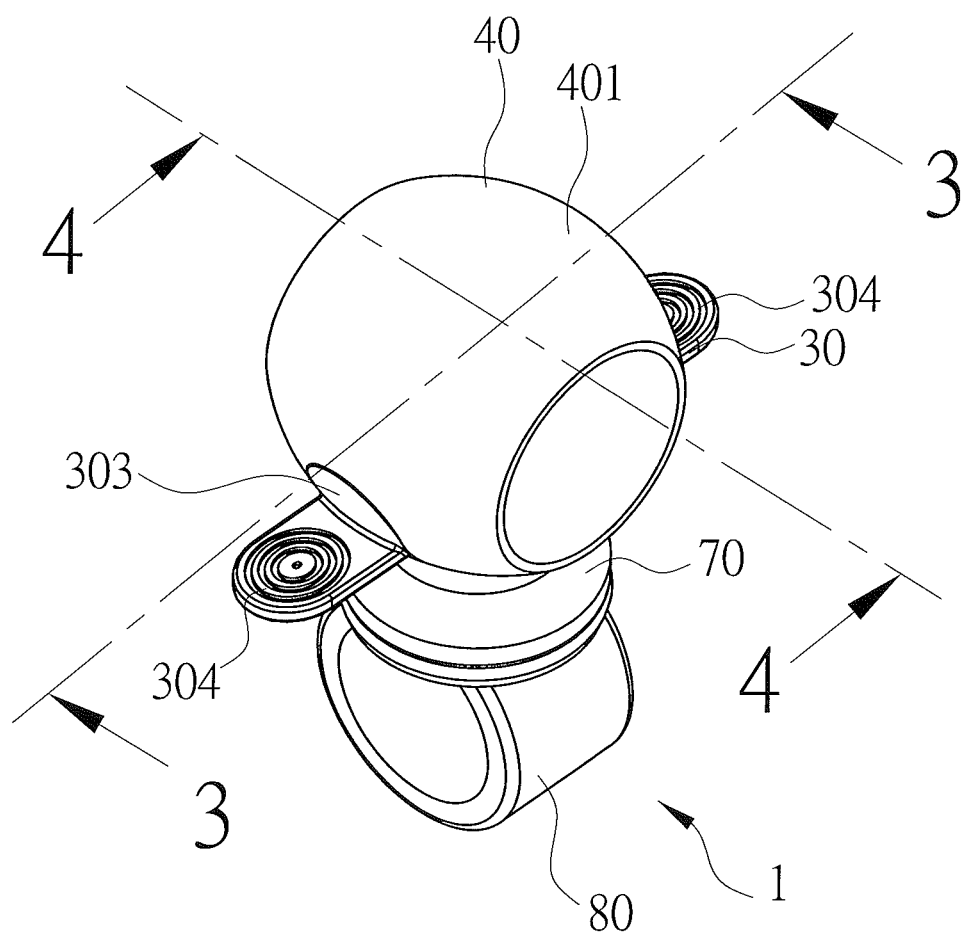
FIG. 1 is a perspective view of a bell device according to an embodiment of the present invention.
Figure 2:
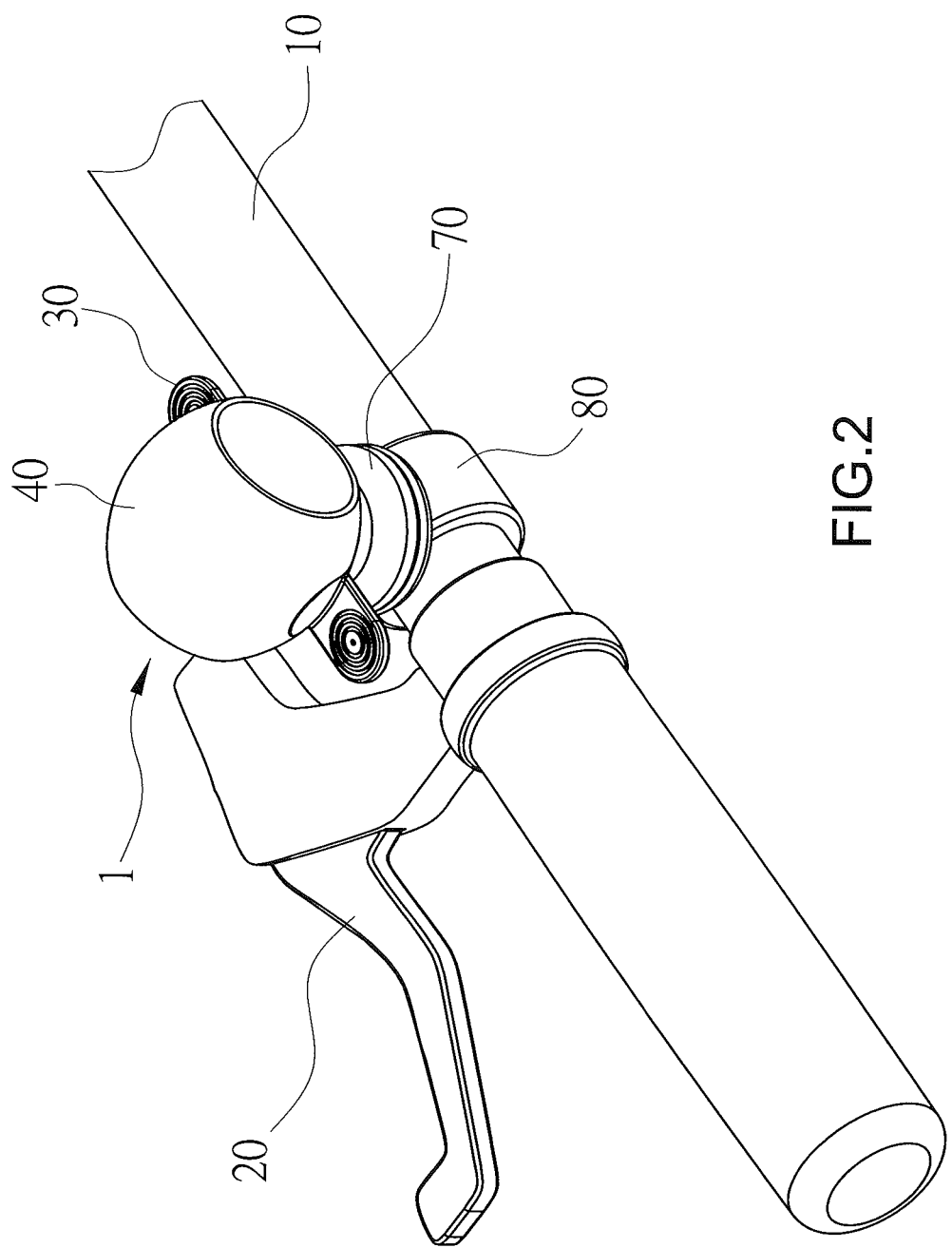
FIG. 2 is a schematic view of the bell device in FIG. 1 installed on a bicycle handlebar.
Figure 3:
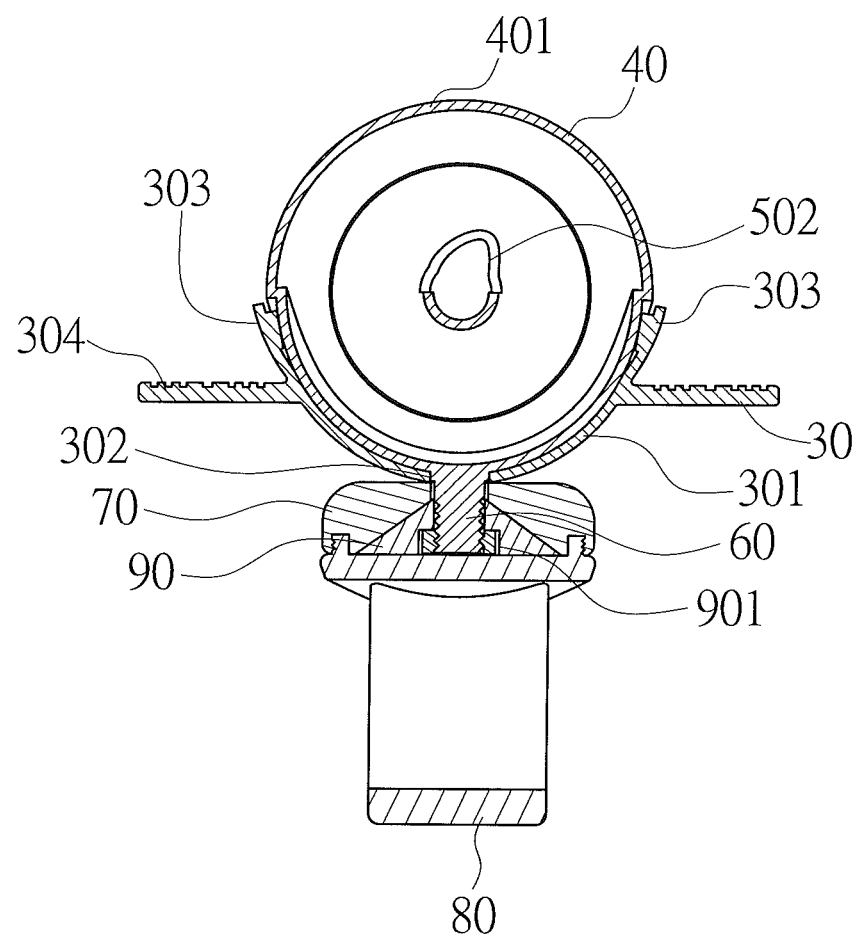
FIG. 3 is a cross sectional view taken along plane 3-3 in FIG. 1.

A bell device 1 according to the preferred teachings of the present invention is shown in FIGS. 1 through 5 of the drawings and adapted to be installed on a bicycle handlebar 10 on which a brake control unit 20 used to activate a brake function is mounted. The bell device 1 includes a main body 40, a base 70, and a trigger 30.

Figure 4:
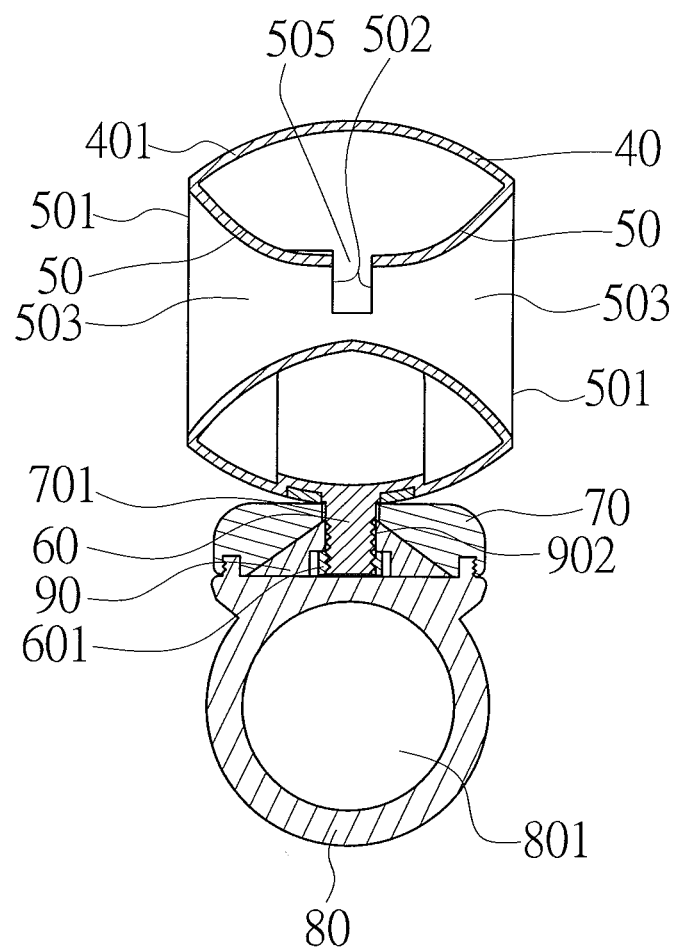
FIG. 4 is a cross sectional view taken along plane 4-4 in FIG. 1.
Figure 5:
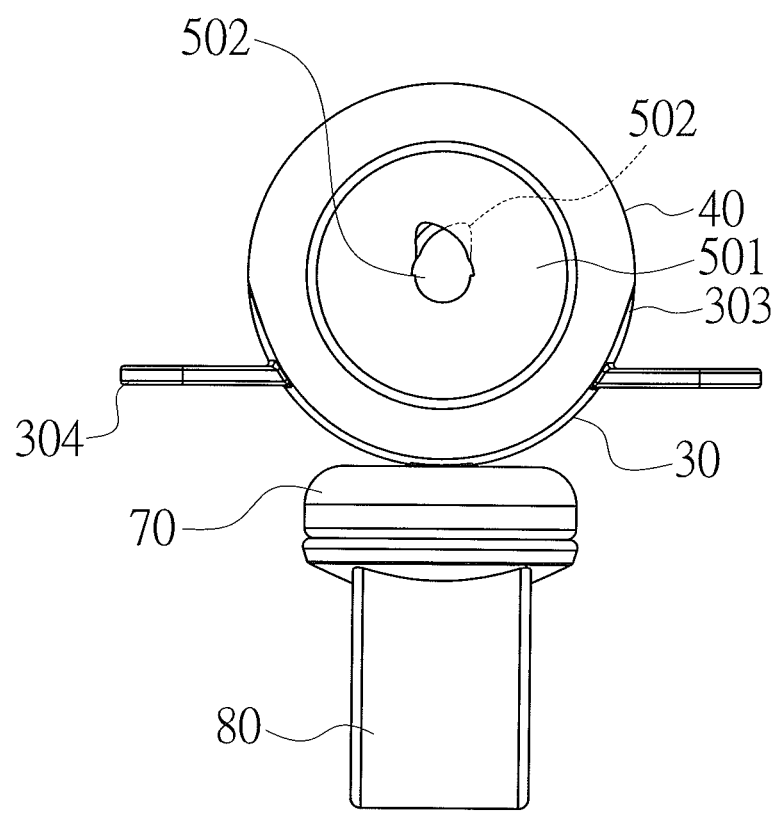
FIG. 5 is a plane view of the bell device in FIG. 1.

In the embodiment, the main body 40 is a spherical hollow body with a peripheral wall 401 and includes two resonance chambers 50 inside the peripheral wall 401 and in communication with each other. Each of the resonance chambers 50 includes an external opening 501 in the peripheral wall 401 of the main body 40, an internal opening 502 in an inner end thereof, and a cavity 503 tapered from the external opening 501 to the internal opening 502 (see FIG. 4). The internal openings 502 of the chambers 50 are spaced from each other, defining a pinhole 505 between the two chambers 50 (FIG. 4). A constant whistling sound is generated from turbulent air flows induced inside the cavity 503 when wind from the external opening 501 in one chamber 50 passes through the pinhole 505. In the embodiment, the internal openings 502 of the chambers 50 are arranged as a mismatch pattern (see FIG. 5) by which a sound induced by wind introduced into the main body 40 is distinct. Moreover, a support member 60 is provided on a bottom of the main body 40 and includes external threads 601 at a lower end thereof.

Figure 6:
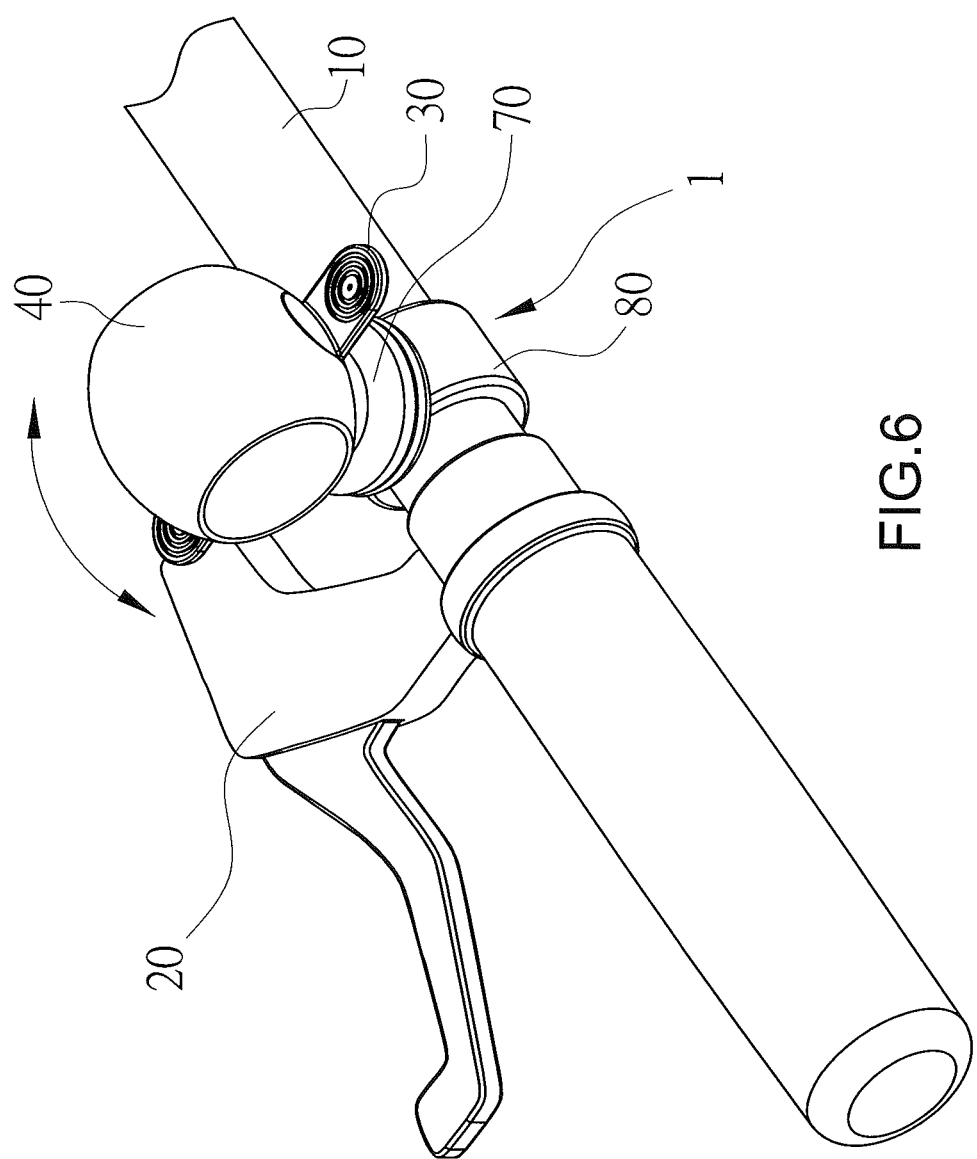
FIG. 6 is a schematic view which illustrates a main body of the bell device in FIG. 2 is rotated 90 degrees.

The base 70 is engaged with the support member 60, allowing the main body 40 supported by the base 70 to be rotated relative to the base 70 (see FIG. 6). In the embodiment, a clamp ring 80 is integrated on a bottom of the base 70 and includes a mounting hole 801 through which the handlebar 10 extends, allowing the base 70 to be fixed on the handlebar 10. Moreover, a conjunction member 90 is securely held inside the base 70 and includes a fastener 901 therein. Two through-holes 701, 902 aligned to each other are centrally provided in the base 70 and the conjunction member 90, respectively. The lower end of the support member 60 penetrates the through-holes 701, 902 of the base 70 and the conjunction member 90 and is coupled with the fastener 901, so that the conjunction member 90 and the main body 40 can be forcibly rotated together relative to the base 70.

Figure 7:
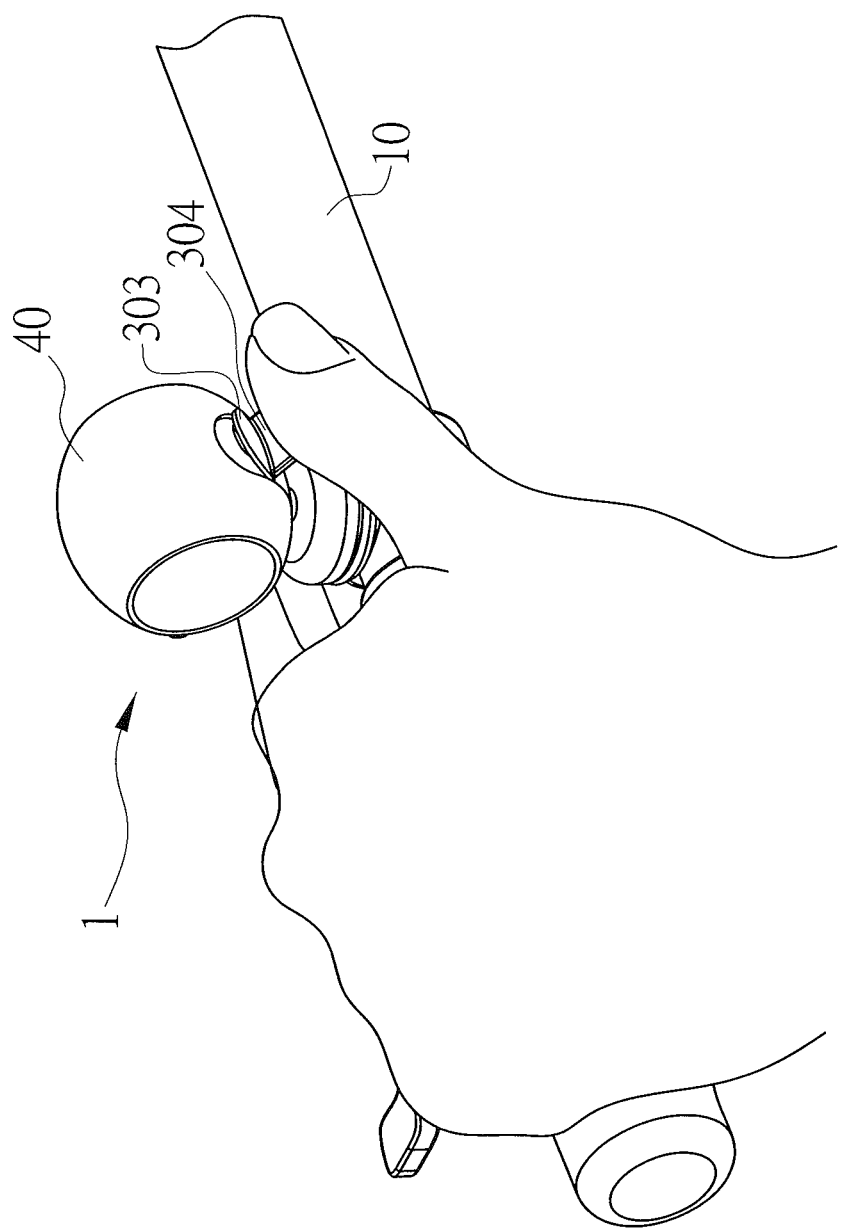
FIG. 7 is a schematic view which shows a trigger of the bell device in FIG. 6 is operated to make a warning sound.

The trigger 30 includes a flexible operating member 301. In the embodiment, the operating member 301 is installed and positioned between the bottom of the main body 40 and the base 70. The operating member 301 is in the form of an arcuate shape and includes an aperture 302 which is penetrated by the support member 60. The operating member 301 includes two knocking portions 303 formed at two sides thereof and adjacent or attached to the main body 40. When an operating portion 304 extending from each of the knocking portions 303 is activated, one corresponding knocking portion 303 is slightly spaced from the main body 40 (see FIG. 7). When the operating portion 304 is released, the corresponding knocking portion 303 beats the main body 40 for generation of a sound.

As shown in FIG. 8, the bell device 1 in service is able to induce a constant whistling sound for warning approaching vehicles and pedestrians when wind is introduced into one tapering chamber 50 via the external openings 501 as well as the pinhole 505. Accordingly, the bell device 1 for a sound generated continuously contributes to traffic safety and prevents a biker from accidents when the biker cycling a long distance feels fatigued and forgets to ring the bell device 1. In addition, the constant whistling sound can be muffled by a biker depending on personal preference or traffic status. In this regard, the main body 40 of the bell device 1 can be rotated a certain angle about the base 70 (e.g., 90 degrees in FIG. 6) to prevent wind from entering the resonance chambers 50 of the main body 40 and make no whistling sound. As such, one biker may activate the trigger 30 to make a warning sound according to traffic status.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A bell device, comprising:
a main body including a peripheral wall and two resonance chambers formed inside the peripheral wall and being in communication with each other, with each of the two chambers including an external opening in the peripheral wall, an internal opening in an inner end thereof, and a cavity tapered from the external opening to the internal opening, with a pinhole defined between the two chambers, with a support member provided on a bottom of the main body;
a base adapted to be mounted on a handlebar and engaged with the support member, with the main body rotatable relative to the base; and
a trigger including an operating member installed between the main body and the base, with the operating member including at least one knocking portion,
wherein a constant whistling sound is generated when wind introduced into one of the two chambers passes through the pinhole, and
wherein the knocking portion beats the main body and induces a warning sound when the operating member is manipulated.

2. The bell device according to claim 1, wherein the internal openings of the two chambers are spaced from each other and arranged as a mismatch pattern.

3. The bell device according to claim 1, wherein a conjunction member is held inside the base, with two aligned through-holes respectively provided in the base and the conjunction member, with the support member extending through the through-holes of the base and the conjunction member and coupled with the conjunction member.

4. The bell device according to claim 1, wherein a clamp ring is integrated on a bottom of the base for fixing to the handlebar.

5. The bell device according to claim 1, wherein the operating member includes an aperture which is penetrated by the support member, with the operating member including two knocking portions formed at two sides thereof and adjacent or attached to the peripheral wall of the main body, with an operating portion extending from each of the knocking portions, with a corresponding knocking portion beating the main body for generation of a sound when one of the operating portions is operated.

* * * * *